Figure 1:
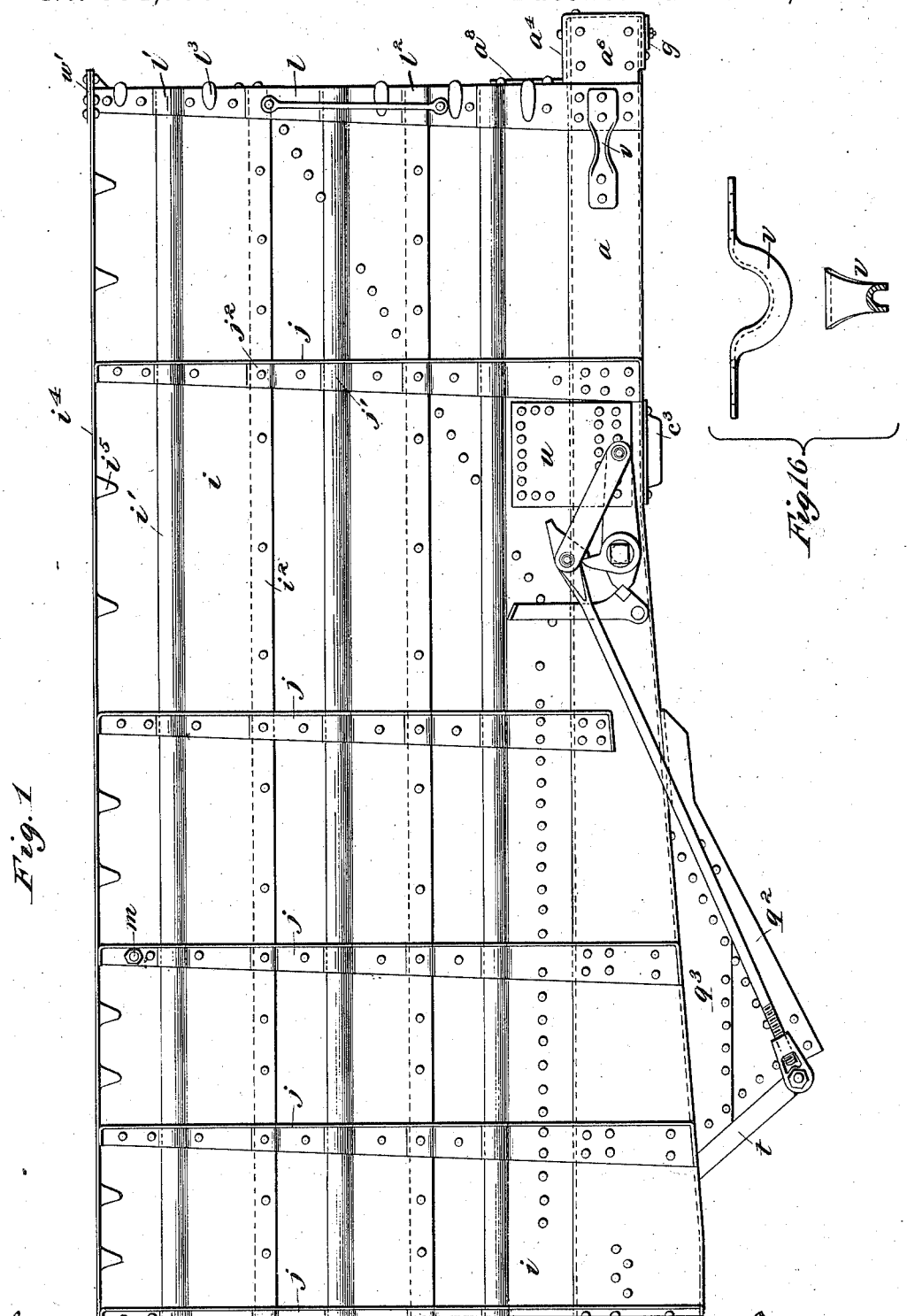

(No Model.) 8 Sheets—Sheet 1.

C. T. SCHOEN.
METALLIC CAR.

No. 584,709. Patented June 15, 1897.

(No Model.) 8 Sheets—Sheet 2.
C. T. SCHOEN.
METALLIC CAR.

No. 584,709. Patented June 15, 1897.

(No Model.) 8 Sheets—Sheet 3.

C. T. SCHOEN.
METALLIC CAR.

No. 584,709. Patented June 15, 1897.

Witnesses
J. F. Coleman
E. A. Finckel

Inventor
Charles T. Schoen,
by Wm. N. Finckel attys.

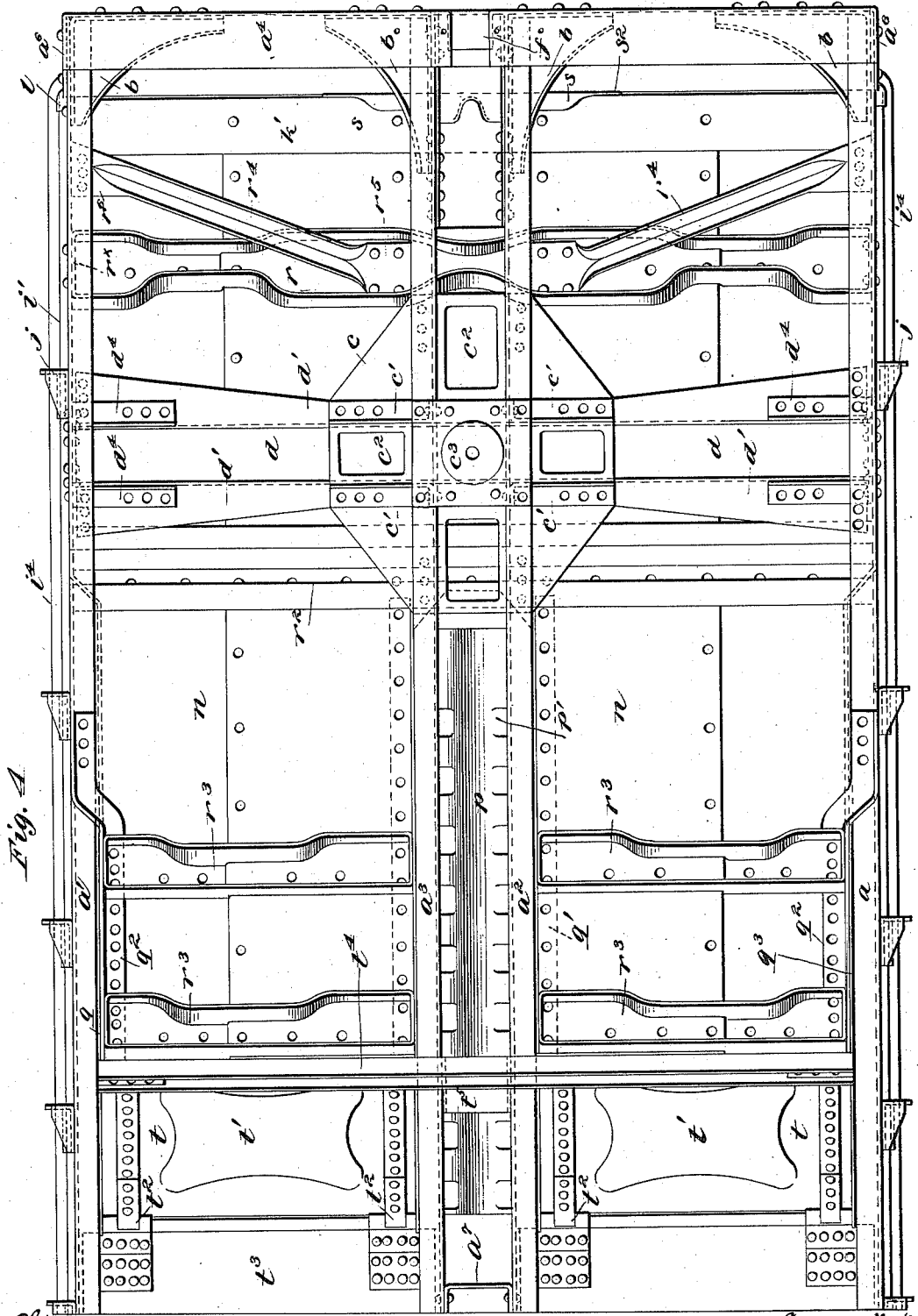

(No Model.) 8 Sheets—Sheet 5.
C. T. SCHOEN.
METALLIC CAR.
No. 584,709. Patented June 15, 1897.
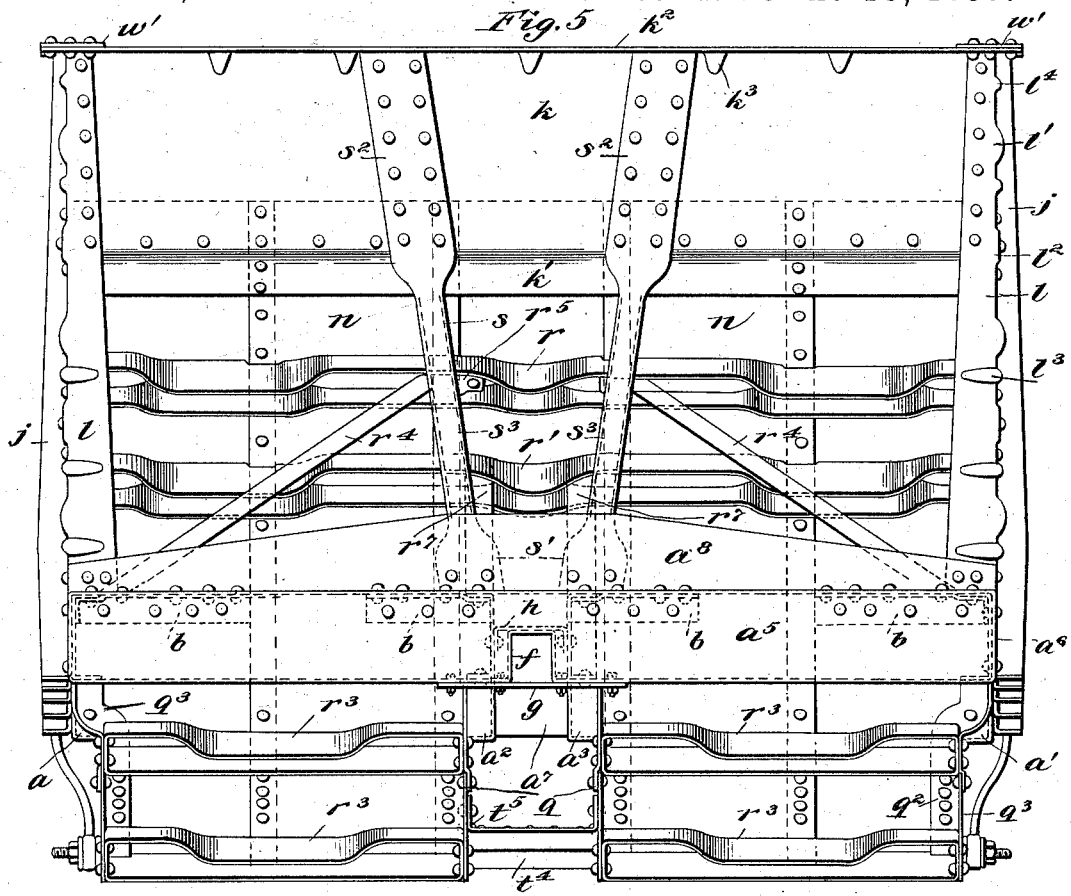

(No Model.) 8 Sheets—Sheet 6.
C. T. SCHOEN.
METALLIC CAR.
No. 584,709. Patented June 15, 1897.
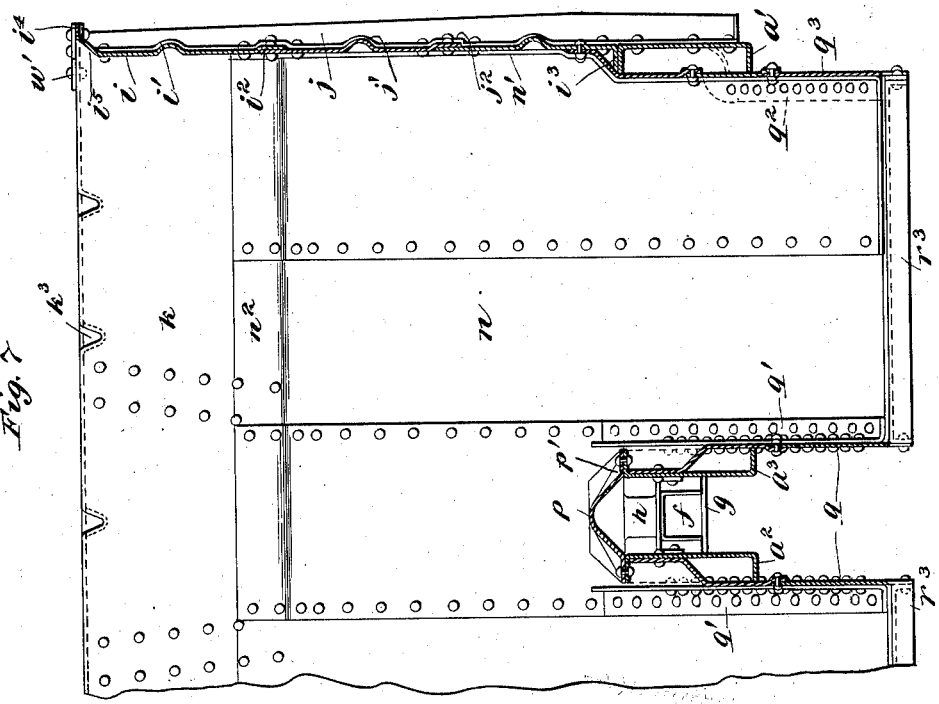
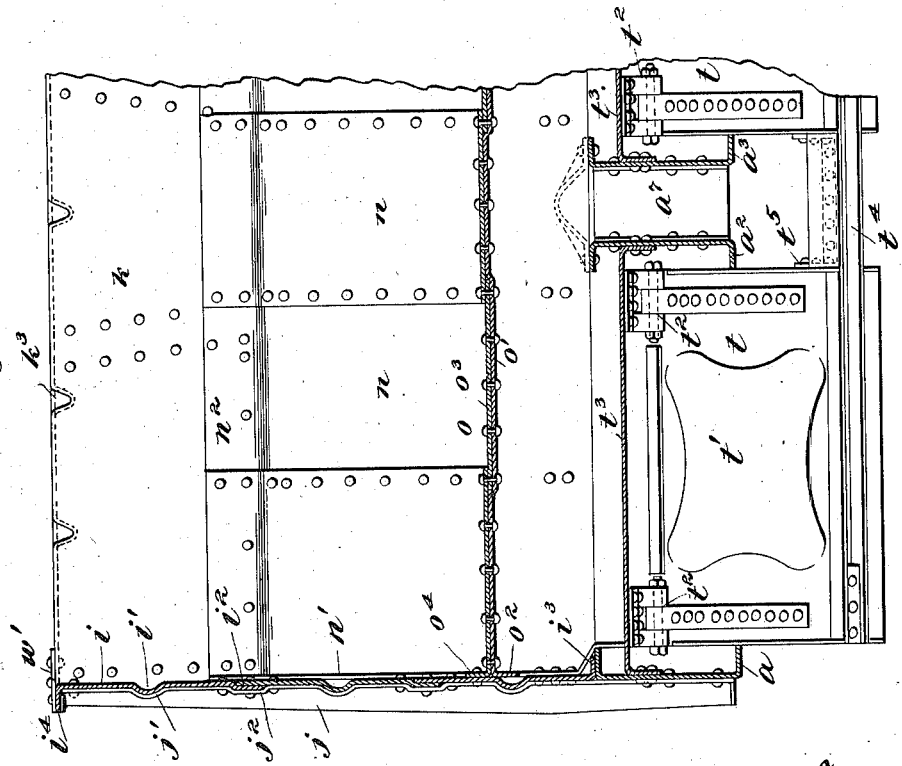
Witnesses
J. F. Coleman
E. A. Finckel
Inventor
Charles T. Schoen.
by Wm. H. Finckel, atty.

(No Model.) 8 Sheets—Sheet 7.

C. T. SCHOEN.
METALLIC CAR.

No. 584,709. Patented June 15, 1897.

Witnesses
J. F. Coleman
E. W. Finckel

Inventor
Charles T. Schoen,
by Wm. H. Finckel
Attys.

(No Model.) 8 Sheets—Sheet 8.
C. T. SCHOEN.
METALLIC CAR.
No. 584,709. Patented June 15, 1897.
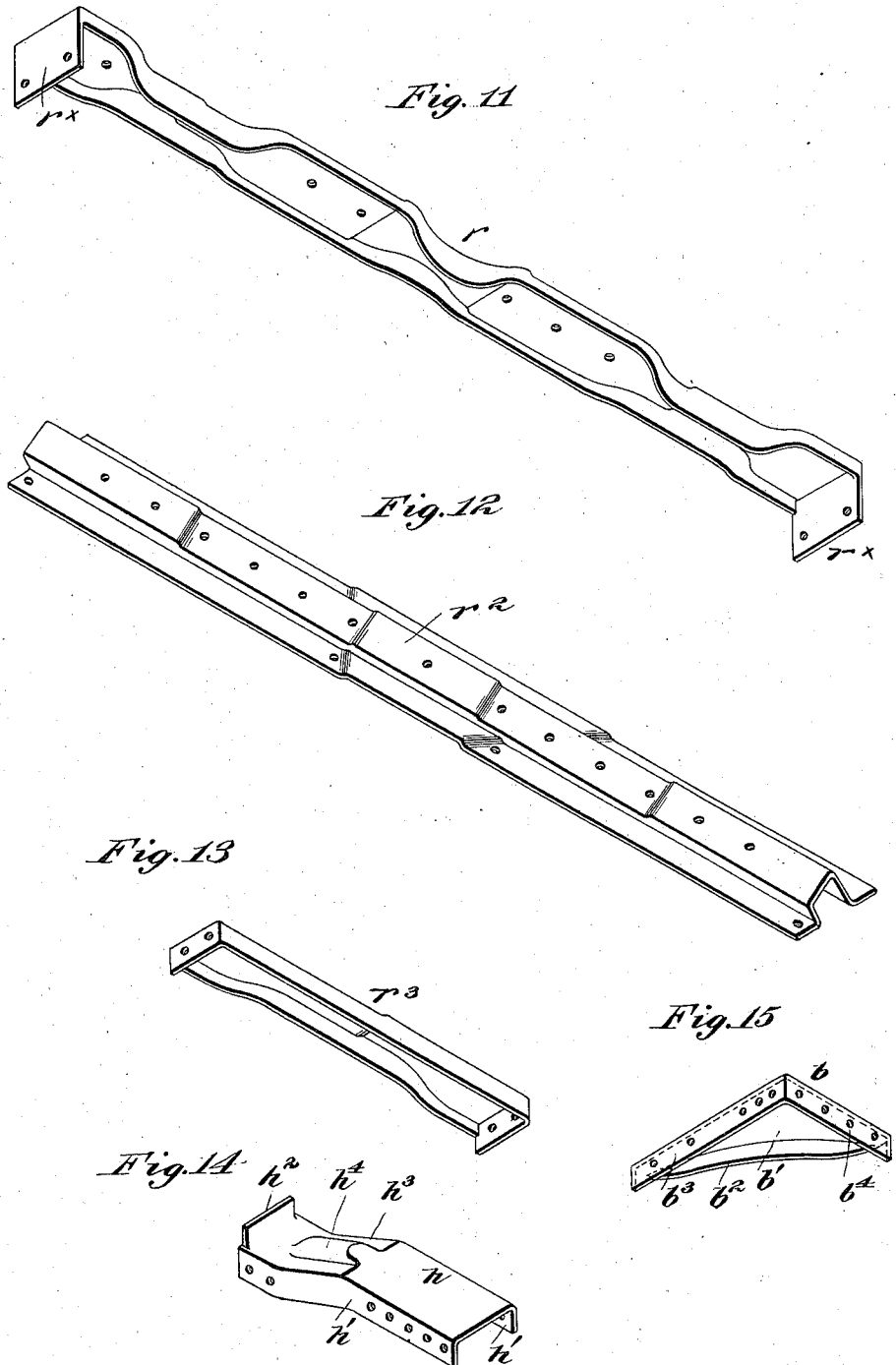

UNITED STATES PATENT OFFICE.

CHARLES T. SCHOEN, OF PHILADELPHIA, PENNSYLVANIA.

METALLIC CAR.

SPECIFICATION forming part of Letters Patent No. 584,709, dated June 15, 1897.

Application filed December 22, 1896. Serial No. 616,628. (No model.)

*To all whom it may concern:*

Be it known that I, CHARLES T. SCHOEN, a citizen of the United States, residing at Philadelphia, in the county of Philadelphia and State of Pennsylvania, have invented a certain new and useful Improvement in Metallic Cars, of which the following is a full, clear, and exact description.

This invention relates, stated generally, to the construction of a railway-car, and, stated specifically, to the construction of a pressed-steel hopper-bottom car.

The invention comprises a number of details of construction, such as the under frame and its sills, the draft-gear, the body-bolster, the bottom, the doors for the bottom, the supports for the bottom, the sides and ends, the stakes and corner-posts, and other parts and combinations of parts, as hereinafter more particularly set forth and claimed.

In order to avoid repetition of the fact, it may be stated now, once for all, that in the preferred construction the parts of my invention may be constructed of mild steel plate, and where special shapes are provided they are produced by the processes and apparatus now largely employed by me for pressing steel into the desired shapes.

I state now that my invention, which has to do with the under frame and the body of the car, may be used in connection with any suitable trucks, but I prefer to use the trucks constructed in accordance with the inventions of my patents, No. 571,934, granted November 24, 1896; No. 563,072, granted June 30, 1896, or No. 553,431, granted January 21, 1896, and I also state that parts of my invention are applicable to wooden cars.

I desire it to be noted also that in the accompanying illustrations of my invention I have endeavored to illustrate the parts in the proportions and arrangements as well as in the construction and conformation which I propose to employ in the manufacture of the invention; but it is clearly within my invention to make alterations in these several particulars, so long as the principle of the invention is retained.

Figure 2:
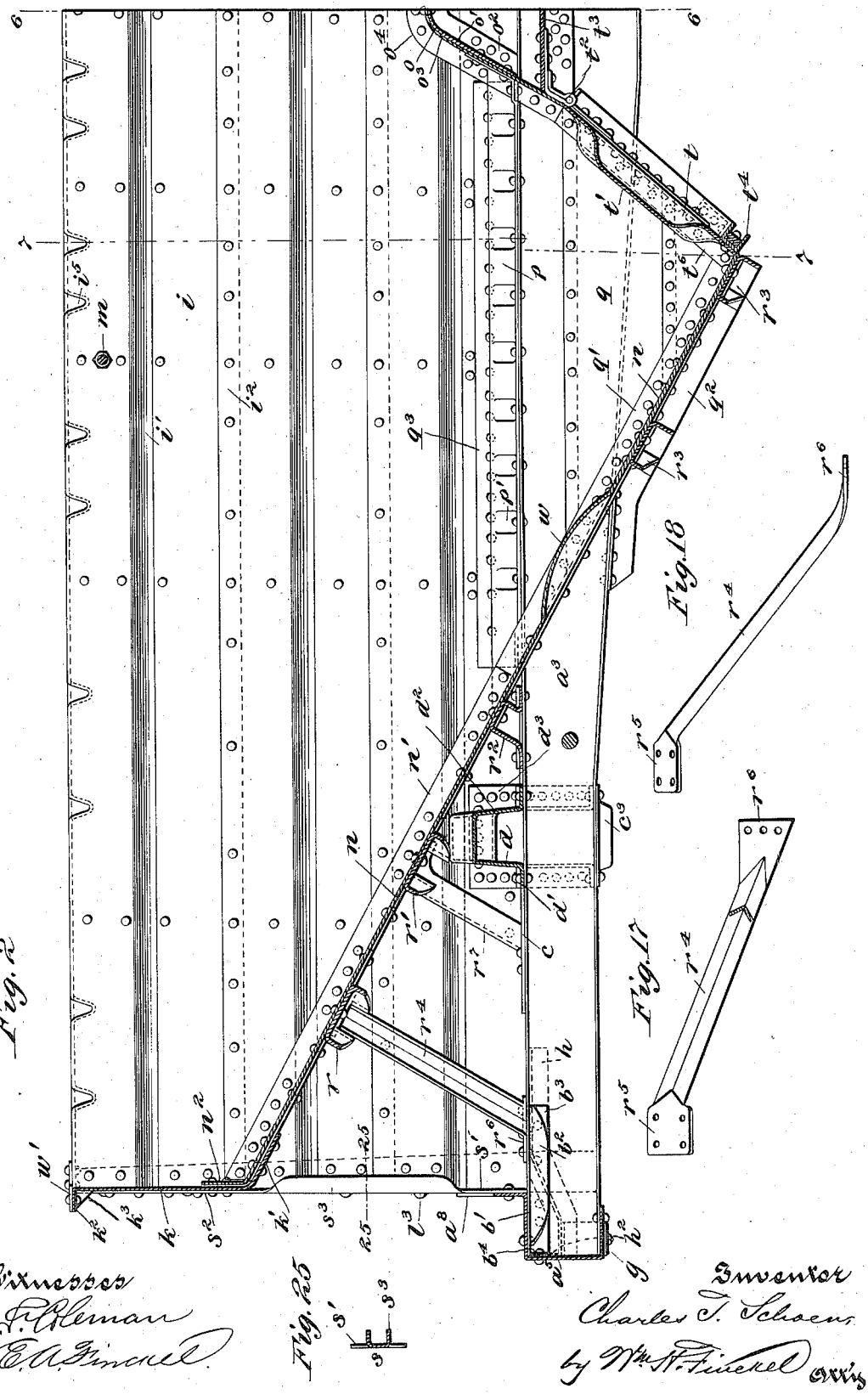
Figure 3:
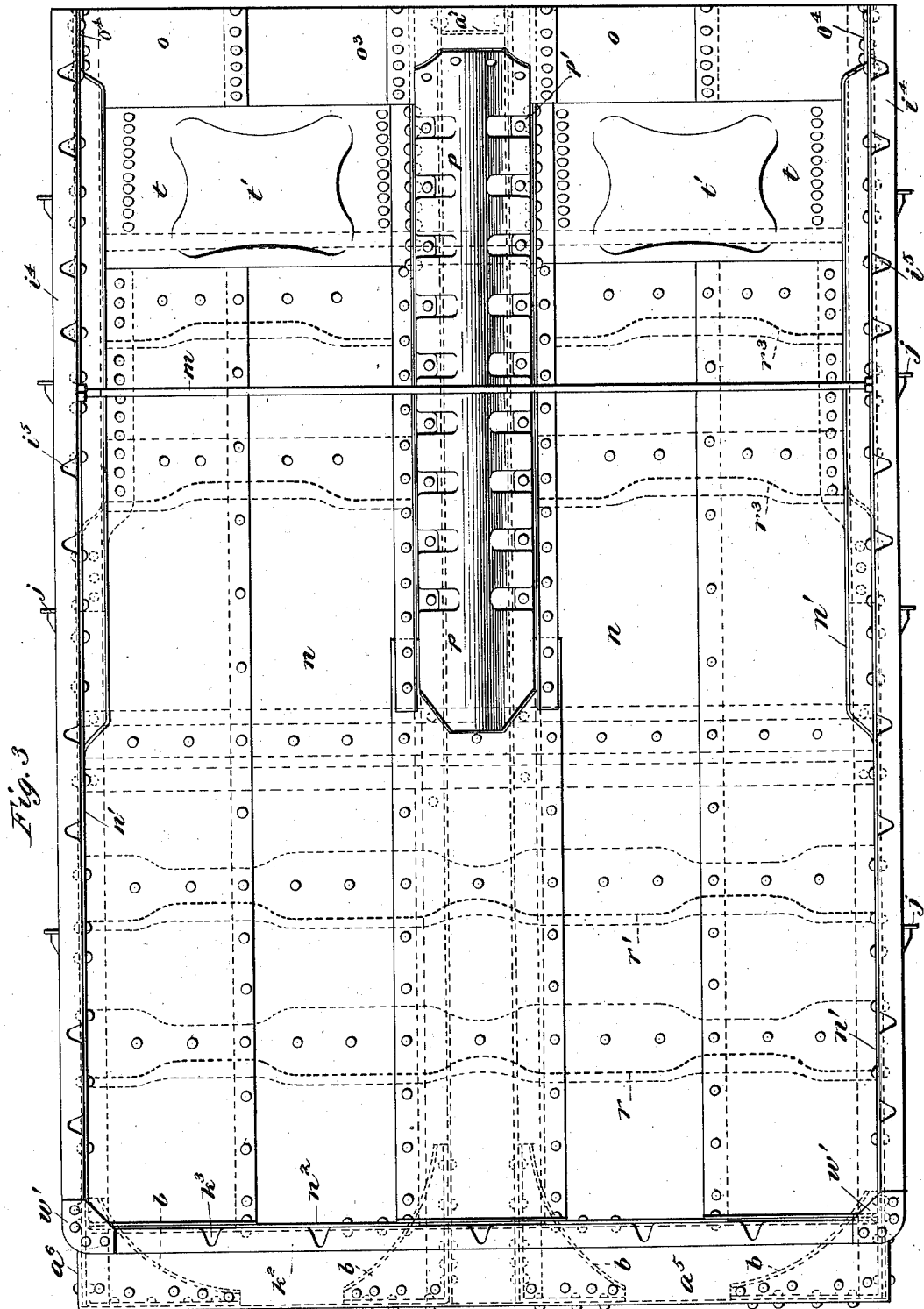
Figure 8:
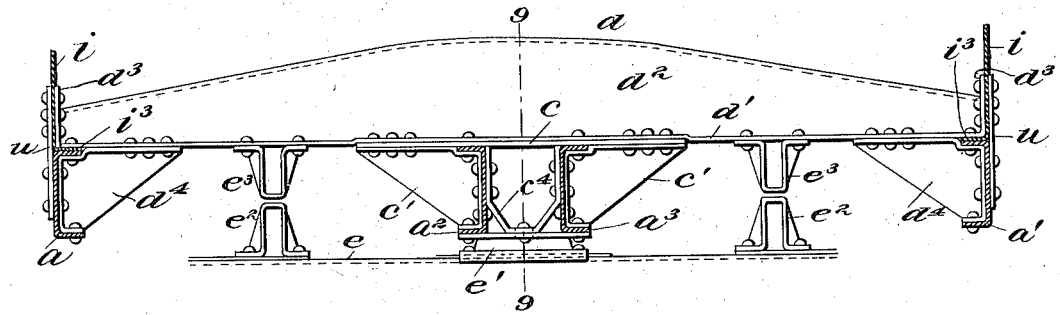
Figure 9:
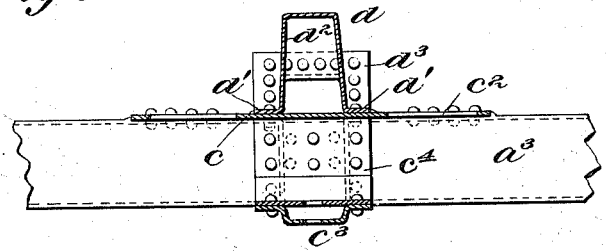
Figure 10:
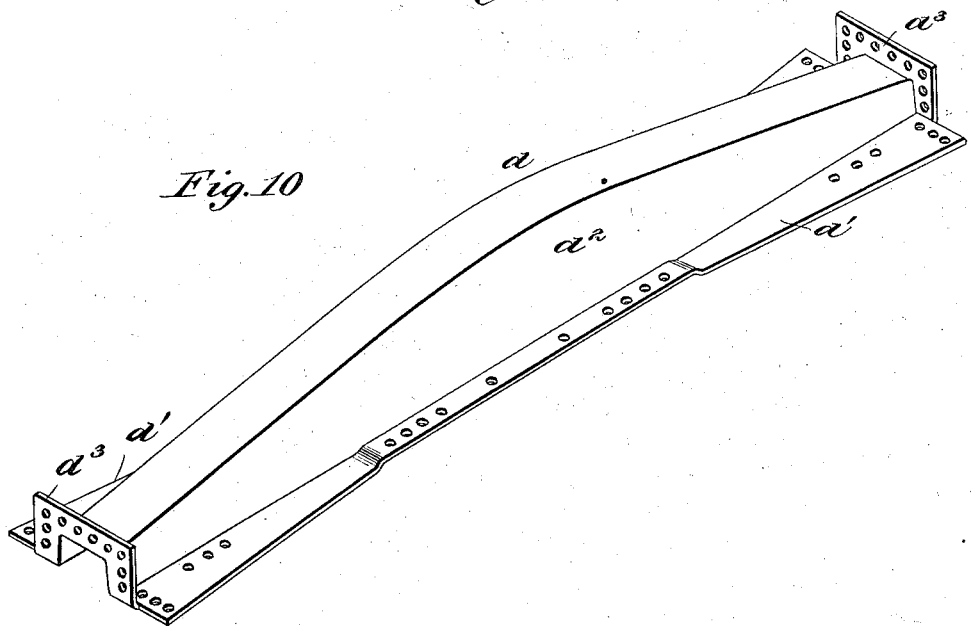

In the accompanying drawings, illustrating my invention, in the several figures of which like parts are similarly designated, Figure 1 is a side elevation of the right-hand half of the car. Fig. 2 is a vertical section of the left-hand half of the car. Fig. 3 is a top plan view of the left-hand half of the car. Fig. 4 is a bottom plan view of the right-hand half of the car. Fig. 5 is an end elevation. Fig. 6 is a cross-section showing more than half of the car from one side and taken in the plane of line 6 6, Fig. 2; and Fig. 7 is a cross-section extending more than half-way across the car from the other side and taken in the plane of line 7 7, Fig. 2. Fig. 8 is a cross-section of portion taken immediately in the rear of the bolster. Fig. 9 is a cross-section of the bolster, taken in the plane of line 9 9, Fig. 8. Fig. 10 is a perspective view of the bolster. Fig. 11 is a perspective view of one of the floor-girders. Fig. 12 is a perspective view of another of the floor-girders. Fig. 13 is a perspective view of one of the chute-floor girders. Fig. 14 is a perspective view of a part of the draft-gear. Fig. 15 is a perspective view of one of the corner-braces used in connection with the sills. Fig. 16 is a top plan view and a cross-section of the roping-staple. Fig. 17 is a top plan view of one of the floor-girder braces with the cross-section developed therein, and Fig. 18 is a side elevation of said girder-brace. Fig. 19 is a perspective view, and Fig. 20 a top plan view, of one of the side stakes or stanchions. Fig. 21 is a perspective view of the corner-post. Figs. 22 and 23 are cross-sections at different points of the corner-post of Fig. 21. Fig. 24 is an end elevation of the lower end of the corner-post. Fig. 25 is a cross-section of an end brace, taken at line 25, Fig. 2.

The under frame for the body of the car comprises the two side sills $a\ a'$, the two center sills $a^2\ a^3$, the general shape of which is shown in Figs. 1, 2, 4, 6, 7, and 8, and the two end sills $a^4\ a^5$, Figs. 1, 2, 3, 4, and 5. The side sills and the center sills are made as channel-beams, deepest at their center, with their bottom lines tapering thence toward the ends, where the upper and lower lines are parallel, as clearly indicated in Fig. 1—that is to say, the top lines of the sills are horizontal, while the lower lines are bellied. By this construction I avoid the necessity of truss-rods and obtain in the longitudinal sills themselves as much strength as would be imparted by the use of truss-rods, and not only so, but I greatly simplify the construction and reduce the cost. The end sills are of the outline shown in cross-section, Fig. 2, and completely box in the ends of the under frame. The end sills are boxed in at the ends, so as to overlap the sides of the side sills to which they are riveted, (see $a^6$, Figs. 1 and 4,) and they are also made with the vertical flanges $a^8$, (see Figs. 2 and 5,) which extend the whole length of the sills—that is to say, the width of the car.

The center sills are braced midway of the car by braces $a^7$, Figs. 3 and 4.

The side sills and the end sills are united by means of angle braces or brackets $b$, and the center sills and end sills are also united by similar brackets $b$, and these several brackets or braces are riveted to the sills. As shown in Fig. 15, these angle braces or brackets are of the general outline of a right-angled triangle, and each is composed of the web $b'$, having the flange $b^2$ on the hypotenuse and the flanges $b^3 b^4$ on the side and base, respectively. The flanges $b^3 b^4$ receive the rivets. This angle brace or bracket may be conveniently struck up, and two of them may be made from a rectangular piece of metal by slitting it diagonally.

At points opposite the truck centers are arranged plates $c$, which, as shown in Fig. 4, are of the general outline of an elongated octagon, and these plates are riveted to the upper flanges of the center sills, as shown in Fig. 8 and as indicated in Fig. 4, and are braced to said sills by means of angle-braces $c'$, which are riveted to the webs and flanges of the said center sills and project out laterally therefrom and riveted to the plate $c$. The plates $c$ may be cut out at $c^2$ to save metal and weight.

$c^3$ is the center plate, which may be riveted to the center sills and to an internal brace $c^4$, Fig. 8, which is riveted to the center sills' webs. The function of the octagonal plates $c$ is to tie or brace the center sills and also the bolster hereinafter described.

The body-bolster $d$, (see Figs. 2, 8, 9, and 10,) contrary to usual practice, is arranged above the sills and within the body of the car. This bolster has a substantially horizontal bottom provided with the lateral flanges $d'$, diverging from the center toward both ends, and the bellied body $d^2$, and at the ends of the said body vertical flanges $d^3$ are formed. The bolster may be struck up of one piece of metal in this construction. The bolster is arranged over the plate $c$ and is riveted thereto and to the flanges of the several sills $a\ a'\ a^2\ a^3$. Angle-brackets $d^4$ are secured to the side sills and their upper flanges are riveted to the side flanges of the bolster, and the rivets uniting the brackets $c'$ and plate $c$ also pass through the flanges of the bolster. The end flanges $d^3$ of the bolster are riveted to the sides of the car. Thus a very rigid construction is provided.

In Fig. 8 $e$ may represent the top of the truck-bolster or transom, $e'$ the center plate, and $e^2 e^3$ the side bearings, all of which may be of usual or approved construction.

The end sills are provided with openings $f$ between the center sills for the passage of the draw-bar, and these openings are flanged inwardly, as indicated in Figs. 4, 5, and 7.

$g$ is a carrier-strap bolted across the bottom of each opening and removable for the purpose of withdrawing the draw-bar when necessary.

A brace $h$, Figs. 2 and 14, abuts against the end sill just over the opening for the draw-bar and extends back slightly at an angle to make a clearance for the draw-bar. This brace $h$ has the side flanges $h'$, by means of which it is riveted or bolted to the center sills, and has the upturned flange $h^2$, which abuts against the end sill. In the clearance-angle $h^3$ of brace $h$ an embossment $h^4$ is made for the purpose of reinforcing the brace. The function of this brace $h$ is to resist the strains incident to the abutting of the draw-head against the end sill.

An under frame constructed in accordance with the foregoing is admirably adapted to receive a body of a hopper-bottom car, whether such body be made of metal or of other material. It is an economical structure and a very rigid and strong one.

The sides of the body are composed of a series of plates $i$, provided with longitudinal corrugations $i'$ for increase of strength and lap-jointed at their meeting edges. The lower edges of adjacent plates have their edges $i^2$ bent or flanged to overlap the adjacent flat edge of the next plate, and thereby the interior surface is left flush. The lowermost plates are provided with inturned flanges $i^3$, Figs. 6 and 7, which rest upon the side sills, and the uppermost plates are provided with flanges $i^4$, which extend outwardly and which are provided at intervals with embossments $i^5$ (see Fig. 1) to prevent the breaking down of the flanges and to reinforce the plates along their upper and exposed edges.

$j$ are the stakes or stanchions arranged along the sides of the car and riveted thereto and to the side sills. These stakes, as shown more especially in Figs. 1, 4, 19, and 20, are composed of right-angled pieces and boxed in at the ends and crimped at $j'$ and pocketed at $j^2$, respectively, to conform to the corrugations and lap-joints of the sides. The upper ends of these stakes are fitted beneath the upper flanges of the sides and may be riveted thereto or not, as desired.

The ends of the body may each comprise one or more plates $k$, corrugated or not, as desired, and having an inturned bottom flange $k'$ to form the upper support for the floor, and also provided with the outwardly-projecting edge flange $k^2$, which is constructed with the embossment $k^3$ to strengthen said flange, as in the case of the side flange.

The sides and ends are jointed together by the corner-posts $l$, Figs. 1 and 5 and 21 to 24, These corner-posts are also provided with crimps $l'$ and pockets $l^2$, respectively, to correspond with the corrugations and joints of the side plates, and may be further strengthened by the embossments $l^3$, which extend around the angle, (see Fig. 23,) and by the embossments $l^4$, which extend along one side only. (See Fig. 22.) The corner-posts also extend down to and are riveted to the side and end plates and to the side sills.

The sides may be tied together by the transverse tie-rods $m$, any number of which may be employed.

Without thereby limiting my invention to a double-hopper-bottom car I will describe that construction. The floors slope from each end toward the center of the car. These floors are composed of overlapped plates $n$, as shown in Figs. 2 to 7, the plates being riveted together at their joints. The side plates of the floor are provided with vertical flanges $n'$, which are riveted to the sides of the body. The upper ends of the plates $n$ rest upon and are riveted to the inturned flanges $k'$ of the ends, and for the purpose of strength the several floor-plates may be provided with end flanges $n^2$, Fig. 2, which are also riveted to the ends. The floors extend below the sills and between the side sills and the center sills.

The floor-plates being flanged at the sides, so as to admit of their being riveted to the sides of the car, and also being flanged at the ends, so as to permit of their being riveted to the end plate of the car, simplifies the construction very considerably over the old practice, where angle-strips have been required, such angle-strips being necessarily riveted both to the floor and to the sides. By my construction it is obvious that I save one-half in the number of rivets employed and also save a corresponding amount of work.

The interior of the body is divided transversely by a conical deflector $o$, which is composed of a foundation-piece $o'$, which may be a single piece, having end flanges $o^2$, by which it is riveted to opposite sides of the body. Upon this foundation-piece are riveted the overlapping plates $o^3$, Figs. 2, 3, and 6, the end plates being provided with flanges $o^4$, which also are riveted to the sides. The plates $o^3$ of the deflector extend down into the spaces between the center sill $a^2$ and the side sill $a$ and between the center sill $a^3$ and the side sill $a'$. This deflector, as its name indicates, serves to divide the stream of coal, and in addition, it acts as a cross-girder, supporting the center sills and holding them up, being riveted also to such sills. The car is further divided longitudinally by means of deflectors $p$, whose tops are conical or domed and which are arranged above and riveted to the center sills and extend from the central transverse deflector to the floor, and have flanged ends which are riveted to the central deflector and, if need be, may also have flanged ends which are riveted to the floors. The sides of the longitudinal deflectors $p$ are pocketed at $p'$ for the passage of the rivets. By means of these longitudinal deflectors each end of the car is divided longitudinally, so as to form two discharge-chutes. Plates $q$ constitute the inner sides of these chutes below the top levels of the sills, and these plates $q$ are riveted to the center sills, and said plates and the floors are connected by angle-pieces $q'$, to which both are riveted. Angle-pieces $q^2$ are deflected (see Figs. 4 and 7) inwardly and downwardly beneath the side sills and the floors to support the chutes at the outside, and the outer sides are inclosed by the plates $q^3$, which are riveted to the flanges $n'$ of the floor-plates. The extension sides $q$, as shown in Fig. 7, may be projected from inside of the center sills and riveted to the said sills as well as to the angle-pieces $q'$ of the floors.

The floors are supported by transverse girders $r$, $r'$, $r^2$, and $r^3$, details of which are shown, respectively, in Figs. 2 to 5 and 11 to 13. These girders are in the form of channel-beams, with their upper surfaces provided with alternating depressions and elevations to receive the overlapped floor-plates, and, as shown in Figs. 3, 4, 5, and 11, the sides of the girders $r$ and $r'$ are deflected toward one another for the purpose of increasing their rigidity. The floor-plates are riveted to these girders. The girder $r$ is supported from the sills by means of braces $r^4$, Figs. 2, 4, 5, 17, and 18. These braces have angular or channel bodies (see the section developed in Fig. 17, for example) and terminate in flanges $r^5$ $r^6$, which are respectively riveted to the side sills and to the girder $r$, being arranged obliquely, as shown more particularly in Figs. 4 and 5. The girder $r'$ is supported by braces $r^7$, which rise from the center sills. The girder $r^2$ has base-flanges, (see Figs. 2 and 12,) which are riveted to the several longitudinal sills. The girders $r^3$ are riveted to the floor-plates between and to the angle-pieces which support the chute portions of the bottoms. The girder $r$ is also flanged at its ends, as at $r^x$, Fig. 11, in order to permit of the girder being riveted to the sides, such riveting serving to make the girder also a tie for the sides. The girder $r'$ may be similarly flanged for a like purpose.

In order to resist the load and to strengthen the ends of the car, such ends are provided with the braces $s$, Fig. 5, which rise from the center sills, and are made with the flat ends $s'$, which are riveted to the end sill flanges $a^8$ and diverge upwardly and are provided with the flat ends $s^2$, which are riveted to the ends $k$. These braces have their centers bent into U shape at $s^3$ for reinforcement. (See Fig. 25.) Thus the car is braced in every direction, and the construction hereinbefore described provides for meeting strains in all directions, not only vertically from the load, but also from the side and end pressures and the thrust incident to the fore-and-aft motion of moving cars.

The doors for the chutes, of which there are four for a double-hopper-bottom car, are arranged in pairs, and each door $t$ consists of a plate of metal having a central inwardly-projecting embossment $t'$ for increasing its strength and flanged at its sides and hinged at its upper end, as at $t^2$, the hinges being riveted to cross-pieces $t^3$, Fig. 2. Each pair of doors is connected by a channel-beam $t^4$, (see Figs. 2, 5, and 6,) which extends across the car from outside to outside of the doors, and each pair of doors is further braced by the angle-piece $t^5$, Fig. 6, which is riveted thereto. The doors close against angle-pieces $t^6$, which are riveted to the side extensions $q$ and $q^3$. (See Fig. 2.)

The means shown for opening and closing the doors are those in common use at this time on the Pennsylvania railroad and need no description here.

I prefer to reinforce the sides of the car at the points where the bolsters are arranged, and for this purpose I rivet plates $u$ to the outside, (see Fig. 1,) the end flanges of the bolsters being riveted through the sides and these plates.

The roping-staple (shown in Figs. 1 and 16 and lettered $v$) is struck up or pressed out of plate-steel, with its loop made U-shaped in cross-section and its ends flat, whereby it may be riveted to the sides and to the side sills.

Where the car-body sets low with respect to the trucks, it may be necessary to provide in the extended bottoms the pockets $w$ for the wheels of the trucks. These pockets may be formed by embossing or crowning up the floor-plates. (See Fig. 2.)

The lateral flanges of the sides and ends are united at the corners of the car by means of flat corner-plates $w'$, as shown in Figs. 1, 2, 3, 5, 6, and 7.

It will be understood, of course, that the longitudinal and transverse deflectors are made in cone shape to avoid the coal or similar freight stagnating at these points.

The doors may be flanged around the four sides for strength, and the central embossment serves to resist the pressure of the load.

I have purposely omitted from the drawings such details as are not directly involved in my invention, and as to these details I propose to supply them at discretion.

What I claim is—

1. The pressed-steel door for hoppers of hopper-bottom cars, having a central, inwardly-projecting embossment, and edge flanges, substantially as set forth.

2. An end sill for cars, constructed as a channel-beam having boxed-in ends, and a vertical flange $a^8$ extending the whole length of the sill and integral therewith, substantially as described.

3. An end sill for cars, composed of a channeled piece of metal to inclose the ends of the longitudinal sills, and having an integral vertical flange rising at the end of the car, substantially as described.

4. An under frame for cars, composed of side sills each made of a single piece, deeper at the center than at the ends, and having continuous top and bottom flanges, a pair of center sills extending continuously from end to end of the frame, end sills each composed of a channel-piece of metal to inclose the ends of the longitudinal sills and having an integral vertical flange rising at the end of the car, and corner-brackets for uniting the several longitudinal sills and the end sills, substantially as described.

5. The combination with the under frame and a body erected thereupon, of body-bolsters secured to and above the under frame and also secured to the sides of the body, substantially as described.

6. An under frame for cars, comprising longitudinal sills, a body-bolster erected upon and above the said sills, and laterally-extended brackets secured to the said sills and to the bolster, substantially as described.

7. In an under frame for cars, the center sills, a superposed body-bolster, an octagonal tie-plate connecting the sills and bolster, and laterally-projecting brackets applied to the center sills and the tie-plate in the direction of the length of the bolster, substantially as described.

8. In an under frame, the combination of the center sills, a center plate, and a brace interposed between the center sills and the center plate, and riveted to both, substantially as described.

9. A triangular corner-bracket, for uniting the side and end sills of a car, composed of a web and flanges depending from three sides thereof, the right-angled flanges forming the medium by which the bracket and sills are riveted together, substantially as described.

10. An octagonal brace-plate, adapted to be applied to the center sills and the body-bolster and tie them together, substantially as described.

11. A body-bolster, having its body bellied, its longitudinal edges flanged, and its ends provided with vertical flanges which are adapted to be secured to the sides of the car, the edge and end flanges being integral parts of the bolster, substantially as described.

12. A flanged, channel-shaped brace, $h$, adapted to be secured to and between the center sills and abutted against the end sill adjacent to the draw-bar pocket, substantially as described.

13. A car-body, having its sides composed of plates of metal, having their edges overlapped and riveted together, the upper plates being flanged outwardly at their upper edges, and embossed vertically, substantially as described.

14. A car-body, having an end plate provided with an inturned bottom flange, which is adapted to receive and support the floor plates, substantially as described.

15. A car-body, having ends, combined with braces having flat ends and a channel-body, and secured to the under frame adjacent to the center sills and diverging upwardly therefrom, and rigidly secured to the said ends, substantially as described.

16. A side stake, made as a rectangle, having boxed-in ends, and with one side riveted to the sides and sills of the car, and crimped and pocketed to conform to the surface of the sides, and the other projecting laterally from the car, substantially as described.

17. Corner-posts, made substantially as rectangles, and extending from top to bottom of the car-body, and riveted to the sides and ends and to the sills, and provided with embossments, substantially as described.

18. A hopper-bottom car, having its floor composed of overlapped plates of metal, flanged at their ends, and riveted to the ends of the car, transverse girders to which the said floor-plates are secured, and supports extending from said girders to the under frame, substantially as described.

19. A metallic floor for cars, composed of overlapped plates, flanged at the ends, combined with the end plates having supporting-flanges, the floor-plates next to the car sides also being flanged and such flanges riveted to the sides, substantially as and for the purpose described.

20. In a car, floor-girders, made as metallic channel-beams, constructed with alternating depressions and elevations to receive the floor-plates, and adapted to be secured to the sides, and to be supported from the under frame, substantially as described.

21. A cross-girder, constructed as a channel-beam and having alternating depressions and elevations for supporting the floor-plates of a car, and having flanged ends whereby it is adapted to be riveted to the sides of the car, substantially as described.

22. A floor-girder, $r^2$, having a channel-like body, shaped to receive the floor-plates, and provided with flanged edges whereby it is adapted to be riveted to the under frame, substantially as described.

23. In a car, a floor-girder, made of a metallic channel-beam, having its bearing-surface to which the floor-plates are secured, constructed with depressions and elevations to adapt it to overlapped floor-plates, substantially as described.

24. In a car, a floor-girder, made of a metallic channel-beam having its bearing-surface shaped to receive overlapped floor-plates, and having flanged sides pressed inwardly at intervals to increase the rigidity of such girder, substantially as described.

25. In a double-hopper-bottom car, the combination with the under frame and the body, of a substantially central transverse cone, having end flanges riveted to the sides, and edge flanges riveted to the sills, substantially as described.

26. In a hopper-bottom car, a transverse central deflector, composed of a foundation-piece having flanged ends which are riveted to the sides of the body, and an exposed surface composed of overlapped plates, the plates at the ends of the deflector being provided with end flanges which are riveted to the sides of the car, substantially as described.

27. In a hopper-bottom car, a central transverse deflector, provided with end flanges riveted to the sides of the car, and edge flanges, combined with the under frame to which such edge flanges are riveted, substantially as described.

28. In a hopper-bottom car, the floor and a floor-girder, combined with an under frame, and girder-supports rising obliquely from the sides of the under frame and converging toward the middle of the girder, substantially as described.

In testimony whereof I have hereunto set my hand this 21st day of December, A. D. 1896.

CHARLES T. SCHOEN.

Witnesses:
R. A. GEORGE,
W. D. GEORGE.